United States Patent [19]
Lienemann et al.

[11] 3,885,704
[45] May 27, 1975

[54] PRESSURE EQUALIZER FOR PNEUMATIC PLANTER

[75] Inventors: Darlo E. Lienemann, Darien; Daniel Henry, Downers Groove, both of Ill.

[73] Assignee: International Harvester Company, Chicago, Ill.

[22] Filed: May 24, 1971

[21] Appl. No.: 146,258

[52] U.S. Cl. ............................................ 221/211
[51] Int. Cl. ............................................ A01c 15/00
[58] Field of Search ............ 222/193, 194; 221/211

[56] References Cited
UNITED STATES PATENTS

| | | | |
|---|---|---|---|
| 3,412,908 | 11/1968 | Ferrault | 222/194 |
| 3,637,108 | 1/1972 | Loesch | 221/211 |

*Primary Examiner*—Robert B. Reeves
*Assistant Examiner*—Thomas E. Kocovsky
*Attorney, Agent, or Firm*—F. David AuBuchon; Floyd B. Harman

[57] ABSTRACT

A seed dispenser for planters including a rotatable seed selector drum having peripheral openings, air under pressure is delivered to the interior of the drum to seat and retain seed in said openings, and the seeds are released and discharged from the drum after a predetermined rotation of the drum. Seeds are fed to the drum from a hopper, and to assure the free flow of seed, air under pressure is also introduced into the hopper to equalize the pressure therebetween and the drum.

3 Claims, 7 Drawing Figures

INVENTORS
DARLO E. LIENEMANN
DANIEL HENRY
BY *F. David Au Buchan* ATT'Y

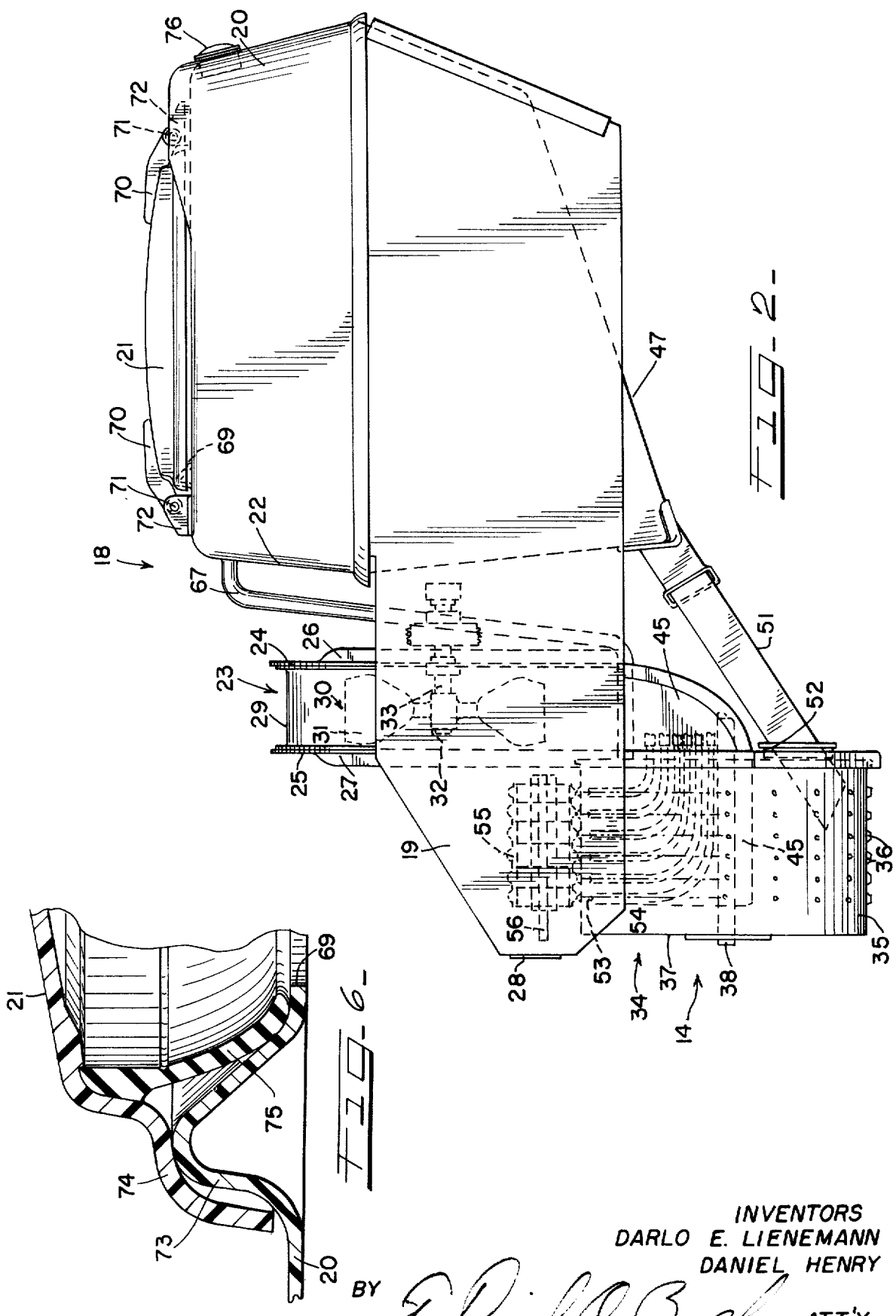

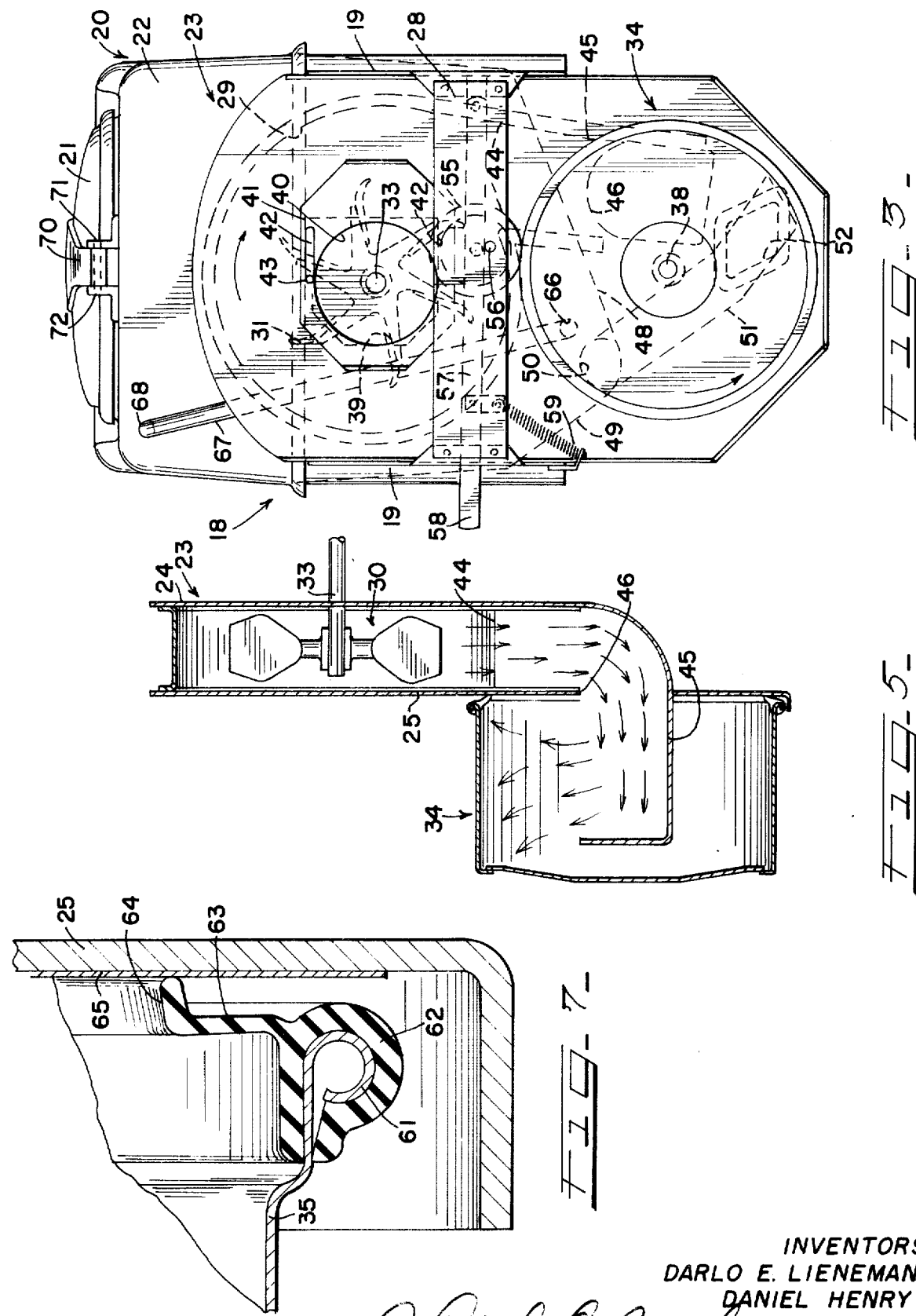

PRESSURE EQUALIZER FOR PNEUMATIC PLANTER

CROSS REFERENCES TO RELATED APPLICATIONS

U.S. Patent to Loeschetal U.S. Pat. No. 3,637,108 issued Jan. 25, 1972; U.S. Patent to Bauman, et al., U.S. Pat. No. 3,762,603 issued Oct. 2, 1973, U.S. Patent to Lienemann, et al., U.S. Pat. No. 3,757,996 issued Sept. 11, 1973, and U.S. Patent to Bauman, U.S. Pat. No. 779,428 issued Dec. 18, 1973.

BACKGROUND OF THE INVENTION

1. Field of the Invention

This invention relates to dispensers and particularly to seed planters. More specifically, the invention concerns a planter of the pneumatic type.

In planters of the type with which this invention is concerned, seed is fed from a hopper to the interior of a rotatable drum having circumferentially spaced seed-receiving openings therein. The interior of the drum is supplied with air under pressure creating a pressure differential between the inside and outside of the drum which attracts and seats seed in the openings. After a predetermined rotation of the drum the seed is released from the openings and is ejected from the drum through guide tubes to the ground. If the air pressure in the seed hopper is atmospheric and the seed is fed by gravity to the seed selector drum the free flow of seed into the drum is impeded.

2. Description of the Prior Art

One attempt to solve this problem has been to elevate the hopper to such a height above the drum and to feed the seed to the drum through a guide tube having such a minimum inclination from the vertical as to provide a "head" of seed sufficient to offset the drum pressure. However, the abnormal height required for the seed filled hopper rendered the planter unstable and the improvement in seed flow was found to be minimal.

Pneumatic type planters are disclosed in U.S. Patents to; Dodwell, No. 2,960,258, of Nov. 15, 1960; Winter, No. 3,142,274, of July 28, 1964; and Ferrault, No. 3,412,908, of Nov. 26, 1968.

SUMMARY OF THE INVENTION

The general purpose of this invention is to provide an air type planter which embraces all the advantages of similarly employed devices and possesses none of the aforedescribed disadvantages. To attain this, the present invention contemplates a unique low profile seed dispenser assembly for planters consisting of a hopper, an air blower and a seed selector drum receiving air under pressure from the blower and seed from the hopper, wherein a free flow of seed from the hopper to the pressurized drum is achieved by also pressurizing the seed hopper to equalize the pressure therebetween and the drum.

An object of the invention is the provision, in a seed dispenser comprising a seed hopper and a seed selector connected to the hopper to receive seed discharged by gravity therefrom, of means for supplying air under pressure to the hopper to facilitate the flow of seed therefrom to the seed selector.

Another object of the invention is the provision of a seed dispenser assembly for planters comprising a seed hopper, a rotatable seed selector drum having peripheral openings therein and to the interior of which seed is fed from the hopper, and air pump or blower connected to the drum to supply air under pressure thereto to seat seed in and discharge the seed from said openings and by-pass means connecting the drum to the seed hopper to pressurize the latter.

DESCRIPTION OF THE DRAWINGS

FIG. 2 is a view in side elevation of the seed dispensing assembly shown in FIG. 1;

FIG. 3 is a view from the rear, with parts removed, of the structure shown in FIG. 2;

FIG. 5 is a diagrammatic view of the air blower and seed selector drum showing the direction of air flow from the blower;

FIG. 6 is an enlarged sectional detail of the air seal in the hopper lid; and

FIG. 7 is an enlarged sectional detail of the air seal in the seed selector drum.

DESCRIPTION OF THE PREFERRED EMBODIMENT

Figure 1:
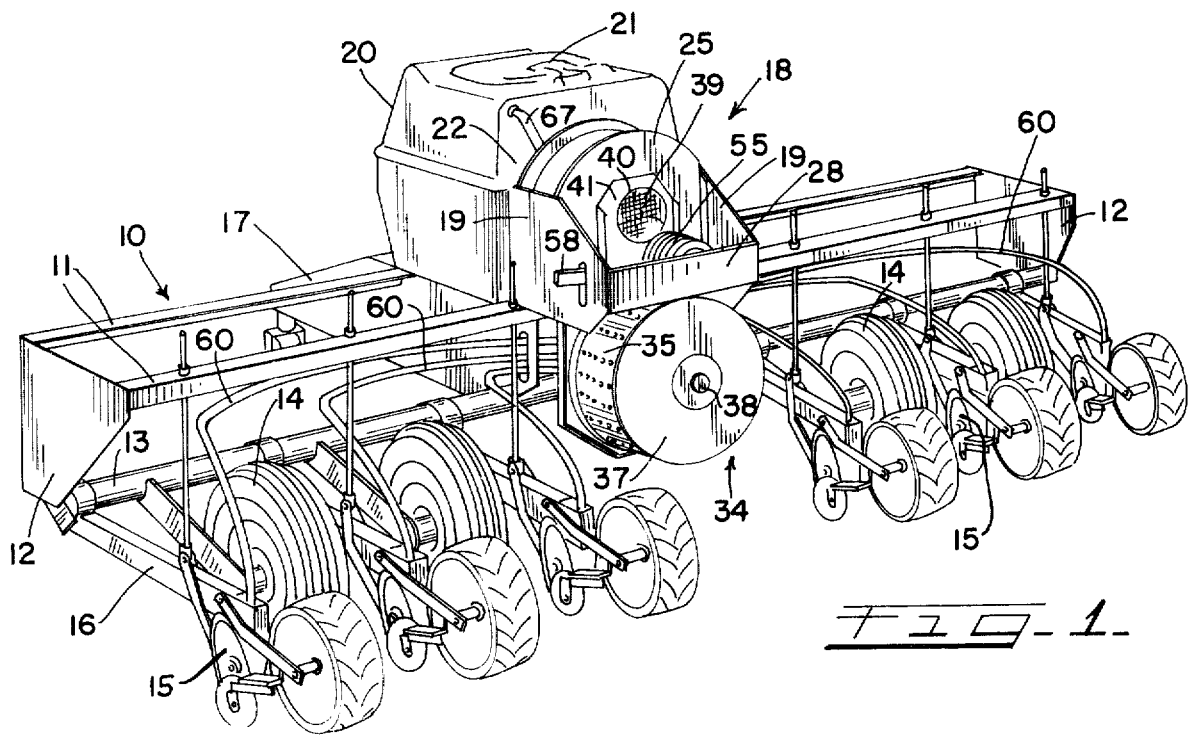
FIG. 1 is a perspective view of a planter adapted for connection to a tractor and having seed dispensing mechanism incorporating the features of this invention.
Figure 4:
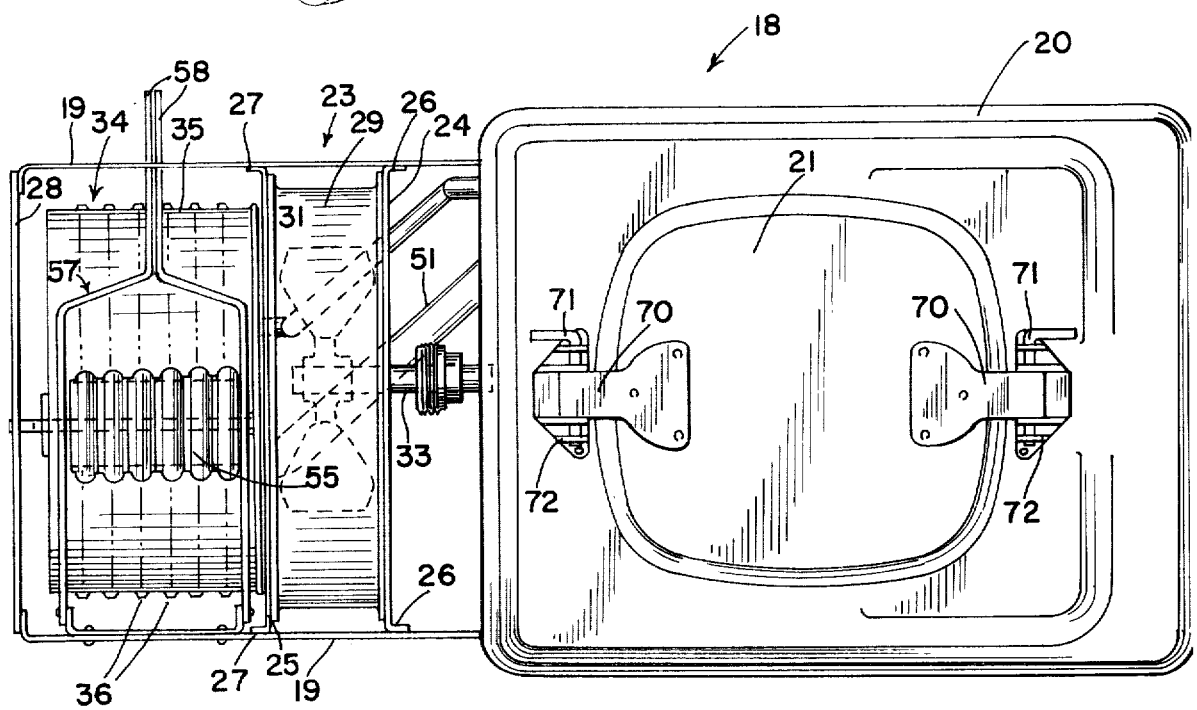
FIG. 4 is a plan view of the structure shown in FIG. 2.

With particular reference to FIG. 1, there is shown a trail-behind planter having a transversely elongated frame generally designated by the numeral 10 and comprising spaced frame bars 11 and end plates 12 carrying the ends of a shaft 13 upon which are mounted supporting wheels 14. Furrow openers 15 are also connected to the shaft by links 16, and a hitch structure 17 projecting forwardly from the center of the frame connects the implement to a tractor, not shown, having a power take-off shaft.

The seed dispenser assembly with which this invention is concerned is designated generally at 18 and is mounted on the center line of the planter frame by means of a pair of upstanding laterally spaced supporting plates 19 affixed to the longitudinally spaced frame bars 11, and between the forward portions of which is mounted a seed hopper 20 having a lid 21.

Supporting plate members 19 are offset inwardly to engage the rear wall 22 of the hopper, and mounted between the rear portions of plates 19 and spaced from the hopper is an air pump or blower 23 comprising front and rear walls 24 and 25 having flanges 26 and 27, respectively, secured to the supporting plate members 19, the rear ends of members 19 being connected by a transverse brace 28. The walls of the blower are connected by a peripheral closure 29 to form a housing for a rotor 30 comprising fan blades 31 mounted on a hub 32 affixed to a shaft 33 extending through the front wall 24 and driven by suitable means, not shown, from the power take-off shaft of the tractor in the direction of the arrow in FIG. 3.

The rear wall 25 of the blower housing extends downwardly below front wall 24 and forms the forward stationary wall of a rotatable seed selector drum 34. Selector drum 34 comprises a peripheral shell portion 35 having axially spaced rows of circumferentially spaced internally beveled seed receiving openings 36 formed therein, and a rear face or wall 37 to which is affixed one end of a shaft 38 the other end of which is rotatably mounted in and projects forwardly from wall 25 and is driven, in a manner not shown, from one of the ground wheels 14 of the planter, in the opposite direction from the blower fan, as indicated by the arrow in FIG. 3.

As best seen in FIG. 3, the rear wall of the blower has an air intake 39 registrable with an opening 40 formed in a damper 41 having slots 42 therein slidably receiving bolts 43 carried by wall 25 to accommodate adjustment of the damper to control the air intake.

Low pressure high volume air generated by the blower fan is discharged tangentially from a bottom opening 44, indicated in FIG. 3, in closure 29 of the blower housing and through a right angled conduit 45 projecting through an opening 46 in the stationary forward wall 25, as indicated in FIGS. 3 and 5 and into drum 34, the air flow being indicated by arrows in FIG. 5.

As will be noted in FIG. 2, the hopper bottom 47 slopes from front to rear and, as viewed in FIG. 3, laterally to one side of the center line of the hopper, forming a relatively long bottom portion 48 and a relatively short portion 49, and seed is discharged from the hopper by gravity through an outlet 50 into a tubular member or seed delivery chute 51. Chute 51 inclines downwardly and rearwardly at a relatively large angle to the vertical, and diagonally inwardly and projects through a sealed opening 52 in the lower portion of wall 25 into the drum to deposit in the bottom of the drum a continuous supply of seed.

As the drum rotates, seed is attracted to the openings 36 in the periphery and is held there by pressure differential between the external atmospheric pressure and the higher pressure in the drum and is carried upwardly in the direction of the arrow in FIG. 3 until the openings 36 carrying the seed are adjacent the openings 53 in the upper ends of seed discharge tubes 54 shown in FIG. 2. There is one tube 54 for each of the axially spaced rows of circumferentially arranged openings 36. As the seeds in the openings 36 successively reach the openings 53 of tubes 54 the pressure differential at each opening is eliminated by closing the exterior of the openings, and this is accomplished by the provision of a series of rubber tired cut-off rollers or wheels 55, one for each of the axially aligned openings 36. Wheels 55 are mounted on a shaft 56 carried between the sides of a fork 57 pivoted at one end on one of the supporting plates 19 and having a handle 58 projecting through a slot in the other plate 19 to accommodate moving the rollers into and out of contact with the periphery of the drum. The fork carrying the rollers may be locked in a raised position, if desired, by means not shown, and the rollers are resiliently held against the drum by a spring 59 anchored at one end to the fork and at its other end to support plate 19.

It may also be noted that seed released from the openings 36 is blown through the tubes 54, which extend downwardly and forwardly through openings provided in wall 25 and are connected, by means not shown, to guide tubes 50, shown in FIG. 1, one for each of the furrow openers 15 to direct seed to the furrows formed thereby.

It should be clear that the drum 34 comprises an integral rear wall 37 and peripheral shell portion 35 the forward edge of which revolves against the stationary forward wall 25. Means are provided for sealing the rotating seed selector drum with respect to wall 25 and this is best shown in FIG. 7, wherein the inner edge of the peripheral portion 35 of the drum is rolled into a bead 61 upon which is mounted a sealing ring 62 having a radially inwardly directed flexible annular flange 63 the inner end of which is bent axially outwardly to form a leg 64 having sealing engagement with a wear ring or plate 65 on wall 25, and as will be observed in FIG. 7 air pressure in the drum directed against the flange 63 maintains the seal.

During operation of the planter the seed chute 51 is filled with seed, and in order to insure a free flow of seed into the pressurized drum means are provided for equalizing the air pressure in the hopper with that in the drum. For this purpose a by-pass opening 66, indicated in FIG. 3, is provided in wall 25 to which is connected one end of a by-pass duct 67 the upper end of which is connected to an opening 68 at the upper end of rear wall 22 of the hopper.

The lid 21 covers the top opening 69 by which the hopper is filled with seed and has secured to the front and rear thereof, hinge members 70, each of which is pivotally connected by hinge pins 71 to lugs 72 affixed to the hopper body. Each of the hinge pins 71 is removable, so that by removing one pin the lid can be pivoted at either the front or rear.

The hopper lid is sealed against the escape of the air under pressure in the manner shown in FIG. 6, wherein a bead 73 formed on the hopper body surrounding the opening 69 is engaged by a shoulder 74 on the lid, and a flexible sealing ring 75 is seated in the lid and is maintained in sealing engagement with the hopper body by the air pressure in the hopper directed against the ring as indicated by the arrows. The operator of the tractor by which the planter is propelled is enabled to verify the maintenance of the desired air pressure in the hopper by the provision of an air pressure gauge 76 mounted in the forward wall of the hopper.

What is claimed is:

1. A seed dispenser assembly for planters comprising, a stationary wall having openings formed therein; a rotatable seed selector formed of a drum having a closed end and an open end, said rotatable seed selector rotatably mounted such that said open end is adjacent said stationary wall, sealing means between said drum and said stationary wall to prevent escape of air under pressure from the drum; a seed hopper having a top opening, a lid, sealing means between said top opening and said lid to prevent escape of air under pressure from the seed hopper, and a seed discharge outlet connected to the seed selector for delivering seed thereto; an air blower for supplying air under pressure to the interior of the seed selector; said openings connected to said blower and to said hopper respectively to direct air under pressure and seed to the interior of the drum; and a by-pass opening formed in said stationary wall, said by-pass opening being connected to the hopper to direct air under pressure to the latter for equalizing the air pressure in the hopper with the air pressure in the seed selector to facilitate the flow of seed to the seed selector.

2. In a planter having a frame, said frame including a stationary wall having an opening therein, a seed selector formed of a drum having a closed end and an open end rotatably mounted on the frame such that said open end is adjacent to said stationary wall, sealing means between said drum and said stationary wall to prevent the escape of air under pressure from the drum, a seed hopper mounted on the frame having a top opening, a lid, sealing means between said top opening and said lid to prevent escape of air under pressure said hopper, and a seed discharge outlet, connecting means between said outlet and the seed selector for feeding seed thereto, means on the frame including a blower connected to said opening for supplying air under pressure to the interior of the seed selector drum, said stationary wall having another opening therein, at a location removed from said seed discharge outlet, connected to said hopper for directing air under pressure to the hopper from the drum and for supplying air under pressure from the drum to the seed hopper to equalize the air pressure between the hopper and the seed selector.

3. The invention set forth in claim 2, wherein an air pressure gauge is mounted in the upper portion of the hopper to register the air pressure in the hopper.

* * * * *